United States Patent
Zhang

(10) Patent No.: US 8,773,535 B2
(45) Date of Patent: Jul. 8, 2014

(54) ADAPTATION FOR CLEAR PATH DETECTION USING RELIABLE LOCAL MODEL UPDATING

(75) Inventor: Wende Zhang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 527 days.

(21) Appl. No.: 12/963,404

(22) Filed: Dec. 8, 2010

(65) Prior Publication Data

US 2012/0147189 A1     Jun. 14, 2012

(51) Int. Cl.
    *H04N 5/14* (2006.01)
(52) U.S. Cl.
    USPC .......................... 348/149; 382/100; 382/104
(58) Field of Classification Search
    None
    See application file for complete search history.

(56) References Cited

U.S. PATENT DOCUMENTS

| | | | | |
|---|---|---|---|---|
| 5,486,819 | A * | 1/1996 | Horie | 340/905 |
| 5,642,093 | A * | 6/1997 | Kinoshita et al. | 340/439 |
| 6,813,370 | B1 * | 11/2004 | Arai | 382/104 |
| 6,838,980 | B2 * | 1/2005 | Gloger et al. | 340/435 |
| 7,089,099 | B2 * | 8/2006 | Shostak et al. | 701/29.6 |
| 7,330,568 | B2 * | 2/2008 | Nagaoka et al. | 382/104 |
| 7,359,782 | B2 * | 4/2008 | Breed | 701/45 |
| 7,630,806 | B2 * | 12/2009 | Breed | 701/45 |
| 7,929,729 | B2 * | 4/2011 | Huang et al. | 382/103 |
| 8,050,459 | B2 * | 11/2011 | Zhang et al. | 382/104 |
| 8,099,213 | B2 * | 1/2012 | Zhang et al. | 701/41 |
| 8,194,927 | B2 * | 6/2012 | Zhang et al. | 382/104 |
| 8,204,277 | B2 * | 6/2012 | Zhang et al. | 382/104 |
| 8,259,174 | B2 * | 9/2012 | Zhang et al. | 348/148 |
| 8,294,794 | B2 * | 10/2012 | Zhang et al. | 348/251 |
| 8,315,766 | B2 * | 11/2012 | Rebut et al. | 701/49 |
| 8,319,854 | B2 * | 11/2012 | Zhang et al. | 348/222.1 |
| 2001/0045981 | A1 * | 11/2001 | Gloger et al. | 348/135 |
| 2004/0183906 | A1 * | 9/2004 | Nagaoka et al. | 348/148 |
| 2005/0192727 | A1 * | 9/2005 | Shostak et al. | 701/37 |
| 2005/0278098 | A1 * | 12/2005 | Breed | 701/45 |
| 2007/0005202 | A1 * | 1/2007 | Breed | 701/29 |
| 2007/0008182 | A1 * | 1/2007 | Miyahara et al. | 340/937 |
| 2007/0021915 | A1 * | 1/2007 | Breed et al. | 701/301 |
| 2007/0024467 | A1 * | 2/2007 | Fujii | 340/937 |
| 2007/0109111 | A1 * | 5/2007 | Breed et al. | 340/435 |

(Continued)

OTHER PUBLICATIONS

Qi Wu, Wende Zhang, Tsuhan Chen, B.V.K.V. Kumar, Camera-based clear path detection, 2010 IEEE International Conference on Acoustics Speech and Signal Processing (ICASSP), Dallas, TX, Mar. 2010.

(Continued)

*Primary Examiner* — Dave Czekaj
*Assistant Examiner* — Kehinde O Abimbola
(74) *Attorney, Agent, or Firm* — John A. Miller; Miller IP Group, PLC

(57) ABSTRACT

A method and system for vehicular clear path detection using adaptive machine learning techniques including reliable local model updating. Digital camera images are segmented into patches, from which characteristic features are extracted representing attributes such as color and texture. The patch features are analyzed by a Support Vector Machine (SVM) or other machine learning classifier, which has been previously trained to recognize clear path image regions. The SVM classifier is adaptively updated using reliable local test samples, such as positive clear path samples which just passed by the vehicle. The resultant classifier, being continuously and adaptively updated with recent, reliable training samples, exhibits improved performance and accuracy in analyzing subsequent image regions or patches for the existence of a clear driving path.

18 Claims, 8 Drawing Sheets

(56) References Cited

U.S. PATENT DOCUMENTS

| | | | |
|---|---|---|---|
| 2007/0152804 A1* | 7/2007 | Breed et al. | 340/435 |
| 2007/0257819 A1* | 11/2007 | Manor | 340/933 |
| 2008/0040004 A1* | 2/2008 | Breed | 701/45 |
| 2008/0046150 A1* | 2/2008 | Breed | 701/45 |
| 2008/0240500 A1* | 10/2008 | Huang et al. | 382/103 |
| 2009/0033540 A1* | 2/2009 | Breed et al. | 342/29 |
| 2009/0256911 A1* | 10/2009 | Hakki et al. | 348/149 |
| 2009/0268946 A1* | 10/2009 | Zhang et al. | 382/104 |
| 2009/0268948 A1* | 10/2009 | Zhang et al. | 382/104 |
| 2009/0290032 A1* | 11/2009 | Zhang et al. | 348/211.9 |
| 2009/0295917 A1* | 12/2009 | Zhang et al. | 348/119 |
| 2010/0014713 A1* | 1/2010 | Zhang et al. | 382/104 |
| 2010/0014714 A1* | 1/2010 | Zhang et al. | 382/104 |
| 2010/0017060 A1* | 1/2010 | Zhang et al. | 701/41 |
| 2010/0097455 A1* | 4/2010 | Zhang et al. | 348/119 |
| 2010/0097456 A1* | 4/2010 | Zhang et al. | 348/119 |
| 2010/0097457 A1* | 4/2010 | Zhang et al. | 348/119 |
| 2010/0097458 A1* | 4/2010 | Zhang et al. | 348/119 |
| 2010/0098290 A1* | 4/2010 | Zhang et al. | 382/100 |
| 2010/0098297 A1* | 4/2010 | Zhang | 382/104 |
| 2010/0100268 A1* | 4/2010 | Zhang et al. | 701/25 |
| 2010/0104137 A1* | 4/2010 | Zhang et al. | 382/104 |
| 2010/0104199 A1* | 4/2010 | Zhang et al. | 382/199 |
| 2010/0121577 A1* | 5/2010 | Zhang et al. | 701/301 |
| 2010/0131197 A1* | 5/2010 | Zhang et al. | 701/209 |
| 2010/0201814 A1* | 8/2010 | Zhang et al. | 348/148 |
| 2010/0276962 A1* | 11/2010 | Zhang et al. | 296/97.2 |
| 2011/0133510 A1* | 6/2011 | Zhang | 296/97.4 |
| 2011/0221901 A1* | 9/2011 | Bai et al. | 348/148 |
| 2011/0304444 A1* | 12/2011 | Zhang et al. | 340/425.5 |
| 2012/0008019 A1* | 1/2012 | Zhang et al. | 348/251 |
| 2012/0008020 A1* | 1/2012 | Zhang et al. | 348/251 |
| 2012/0008021 A1* | 1/2012 | Zhang et al. | 348/251 |
| 2012/0116676 A1* | 5/2012 | Basnayake et al. | 701/469 |
| 2012/0147176 A1* | 6/2012 | Zhang et al. | 348/118 |
| 2012/0147189 A1* | 6/2012 | Zhang | 348/149 |

OTHER PUBLICATIONS

Xiaoming Liu, Tsuhan Chen, Susan M. Thornton, Eigenspace updating for non-stationary process and its application to face recognition, Pattern Recognition, vol. 38, Issue 9, Kernel and Subspace Methods for Computer Vision, Sep. 2003, pp. 1945-1959.

* cited by examiner

ADAPTATION FOR CLEAR PATH DETECTION USING RELIABLE LOCAL MODEL UPDATING

BACKGROUND OF THE INVENTION

1. Field of the Invention

This invention relates generally to camera-based detection of a clear driving path for a vehicle and, more particularly, to a method and system for detecting a clear driving path for a vehicle which uses a classifier trained by training samples, updates the classifier based on reliable local test samples, and uses the updated classifier to improve speed and accuracy of decisions about a clear driving path in the road ahead.

2. Discussion of the Related Art

Many modern vehicles include sophisticated electronic systems designed to enhance the safety, comfort, and convenience of the occupants. Among these systems, driving assistance systems have become increasingly popular. Driving assistance systems require information about what lies ahead of the vehicle in order to determine if any sort of driver warning should be issued or evasive action should be taken.

Various technologies can be used for road detection by driving assistance systems to determine if the path ahead of the vehicle is clear or obstructed. Camera-based systems are widely used for clear path detection, as they have proven to be reliable and low in cost. In camera-based systems, an onboard camera provides images of the path ahead of the vehicle, and the images are processed through various algorithms to determine if the path ahead is clear or not. A common processing method is to use trained classifiers to make a clear path determination.

Trained classifiers are a class of machine learning techniques in which a set of training samples, in this case image regions of clear path roadways, is used to train a model to classify image regions of roadways which have yet to be encountered. A fundamental limitation of trained classifiers is that only a finite number of training samples can be employed, and in environments as diverse as those encountered in real driving situations, there are bound to be test samples which are quite dissimilar from any clear path training samples, yet are in fact image regions of clear path roadways.

There is a need for a clear path detection methodology which can continuously update and adapt its classifier based on recent clear path image regions which were correctly classified. Such a methodology can be used to improve the speed and accuracy of driving assistance systems.

SUMMARY OF THE INVENTION

In accordance with the teachings of the present invention, a method and system are disclosed for vehicular clear path detection using adaptive machine learning techniques including reliable local model updating. Digital camera images are segmented into patches, from which characteristic features are extracted representing attributes such as color and texture. The patch features are analyzed by a Support Vector Machine (SVM) or other machine learning classifier, which has been previously trained to recognize clear path image regions. The SVM classifier is adaptively updated using reliable local test samples, such as positive clear path samples which just passed by the vehicle. The resultant classifier, being continuously and adaptively updated with recent, reliable training samples, exhibits improved performance and accuracy in analyzing subsequent images for the existence of a clear driving path.

Additional features of the present invention will become apparent from the following description and appended claims, taken in conjunction with the accompanying drawings.

DETAILED DESCRIPTION OF THE EMBODIMENTS

The following discussion of the embodiments of the invention directed to adaptive clear path detection using additional classifiers is merely exemplary in nature, and is in no way intended to limit the invention or its applications or uses.

Driving assistance systems in vehicles can provide valuable warning information to drivers, but only if they include a robust road detection system with a clear path detection scheme. Machine learning techniques such as trained classifiers can be useful for clear path detection in camera images of a roadway, but the effectiveness of traditional trained classifiers can be somewhat limited by the fact that only a finite set of training samples can realistically be used. Methods are disclosed herein for continuously updating and adapting classifiers with data from real world roadway images which have been classified with high confidence, thus improving the speed and effectiveness of the classifiers and the overall driving assistance system.

Figure 1:
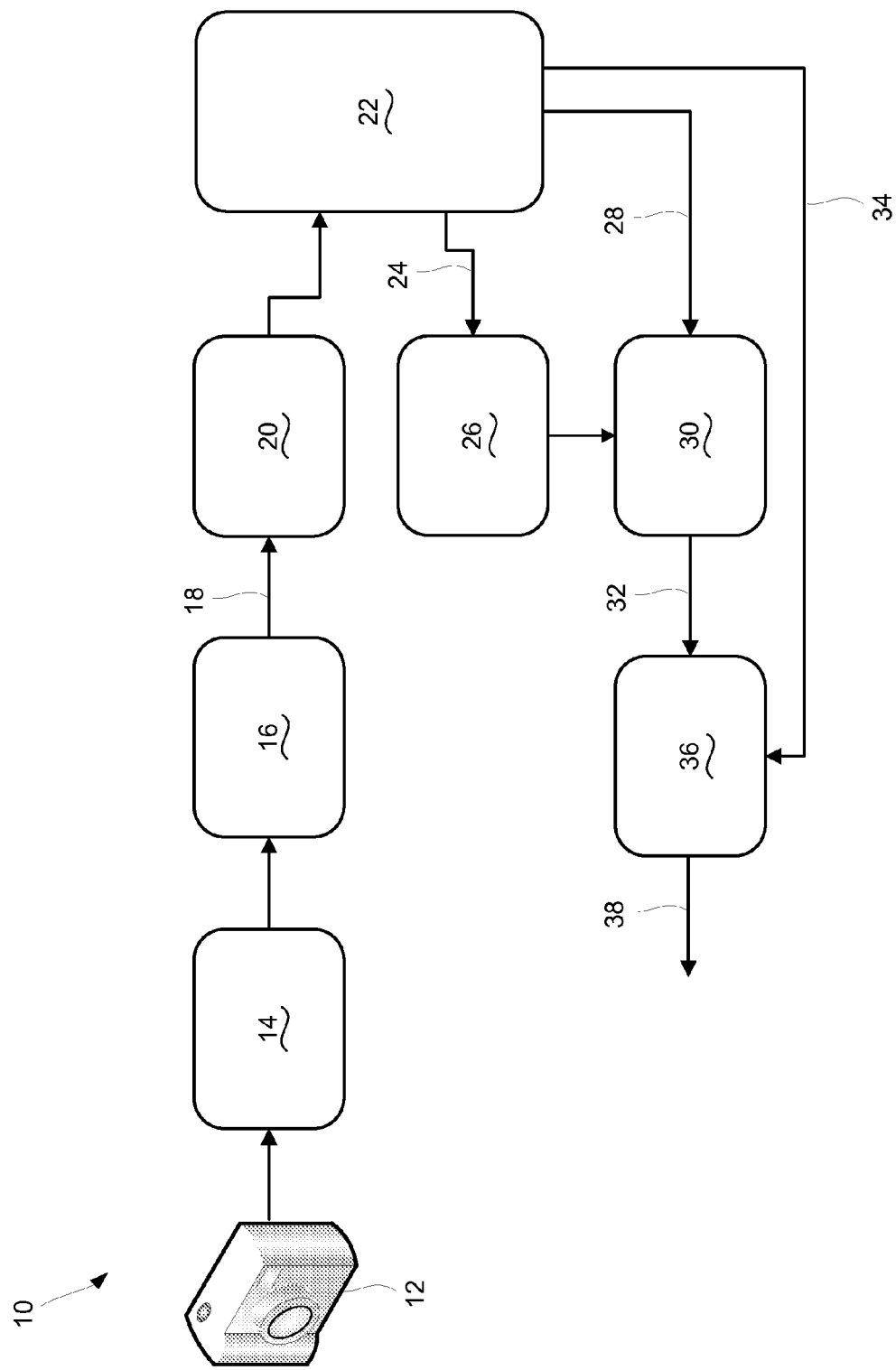
FIG. 1 is a block diagram of a system which can be used to detect a clear driving path for a vehicle using an adaptive machine learning technique with additional classifiers.

FIG. 1 is a block diagram of a system 10 which can be used for clear path detection for a vehicle, using an adaptive classifier updating strategy implemented via an additional classifier. The system 10 includes a camera 12, which is usually mounted inside the vehicle's windshield, facing straight forward. The camera 12 can also be a rear-viewing camera mounted in the area of the vehicle's rear bumper, trunk, or tailgate. The clear path detection methods disclosed herein are applicable to both forward and rearward driving, as long as camera images are available. The camera 12 can be a fairly low resolution model, as high resolution images are more difficult to process, and high resolution is generally not necessary for clear path determination. Also, very high resolution imaging devices may not be able to withstand the harsh physical environment of a vehicle, or may be too large to be practical for the purpose at hand. The camera 12 provides an image to a pre-processing module 14. In actuality, the camera 12 provides a continuous image stream, and the system 10 must make clear path determinations continuously in real time, which is a challenging task.

The pre-processing module 14 pre-processes each image using various processes, such as cropping, scaling, lens shading correction, and others. Lens shading, or vignetting, is a reduction of an image's brightness or saturation at the periphery compared to the image center, as is well understood by those skilled in the art of photography or optics. There are several possible causes of vignetting, including mechanical, optical, and natural. Mechanical and optical vignetting can largely be avoided through proper design of the camera 12. Natural vignetting can be compensated for by applying a correction mask to the digital image, thus offsetting the drop in illumination at the corners of the image. Although not mandatory, this compensation can be done in the pre-processing module 14. The pre-processing functions have been shown to make subsequent processing more effective in many instances. The pre-processing module 14 then provides the pre-processed images to a segmentation module 16.

The segmentation module 16 then segments each image into patches for further processing. In computer vision, segmentation refers to the process of partitioning a digital image into multiple segments (sets of pixels). The goal of segmentation is to simplify and/or change the representation of an image into something that is more meaningful and easier to analyze. Image segmentation is typically used to locate objects and boundaries in images. More precisely, image segmentation is the process of assigning a label to every pixel in an image, such that pixels with the same label share certain visual characteristics. The result of image segmentation is a set of segments that collectively cover the entire image. All of the pixels in a segment or region are similar with respect to some characteristic or computed property, such as color, intensity, or texture. Adjacent segments or regions are different with respect to the same characteristics.

After segmentation, most or all of the segments, also known as patches, are analyzed for clear path potential. However, depending on available processing power, not all patches may be used for classifier training. Patch size is one criterion which may be used to limit which patches are selected for classifier training, where large patches are more important than small patches. This is because the goal of the system 10 is to detect a clear driving path for the vehicle, and small patches around the periphery of the image, which may represent a distant tree or cloud, are less likely to represent a clear driving path. Stated differently, the patch representing the roadway immediately ahead of the vehicle is normally the largest and most important patch in each image. Limiting the number of patches for classifier training thus improves overall processing speed. In one example, a patch size threshold as a percentage of the image size is used, and only patches exceeding the threshold are used for classifier training. However, if processing speed is not an issue, all patches may be used—not only analyzed for clear path potential, but also used for classifier training.

On line 18, one or more patches are provided as output from the segmentation module 16. A feature extraction module 20 processes the patches and extracts numeric features. Feature types used in the feature extraction module 20 may include geometric features, color features, texture features, and Histogram of Oriented Gradients features. Geometric features include patch size, patch centroid location, and the standard deviation of the coordinates of all pixels in a patch. Color features include the mean and standard deviation of the color values of each pixel in a patch, where the color values are represented in a color space, such as YCbCr. Transformed color can also be used as a feature. Texture features indicate whether a patch is very mottled, like leaves on a tree, or very uniform, like a concrete road surface. Histogram of Oriented Gradients features are described by the distribution of intensity gradients in an image segment. In all of the feature types, features may be down-selected to the most relevant and least redundant. Feature extraction and selection techniques are well known to those skilled in the art of pattern recognition and machine learning.

Features of the selected patches are then provided to a first classifier module 22. In one example, the classifier module 22 uses a Support Vector Machine (SVM) classification method, although other types of machine learning classifiers could be used. SVMs are supervised machine learning methods which are trained by a manually-selected and manually-labeled set of training samples. That is, human-selected image patches containing various types of clear paths are processed through the segmentation module 16 and the feature extraction module 20, and the SVM algorithm is trained to recognize the feature patterns of the clear path patches in those images. Ultimately, the SVM algorithm used in the classifier module 22 assigns a probability value to each patch being processed, where a probability value near 1 indicates a high confidence of a clear path, and a probability value near 0 indicates a high confidence of a non-clear path.

While the SVM algorithm in the classifier module 22 is very effective at learning to properly classify image patches which are similar to the training samples which it was previously taught, there will inevitably be image patches which it cannot handle properly due to the practical limit on the number of training samples which can be used. One example of a problematic case is where the classifier module 22 is trained with image patches of paved roadways, and the vehicle then encounters a rough dirt or gravel roadway. In such a situation, the color and texture features of the large patch in the image may be significantly different from any roadway pattern known to the SVM algorithm, and it is likely that the non-paved roadway may be wrongly classified as a non-clear path. This type of situation is known as a false negative. False positives are also possible, where the SVM algorithm wrongly classifies a patch as a clear path, when in fact some structure or object exists in the patch. By adding an adaptive classifier which is trained with image patches from the current driving trip, including lighting conditions and roadway types currently being experienced by the vehicle, clear path detection accuracy can be improved.

To overcome the limitations of traditional SVM classifiers, a second, adaptive classifier can be added. Whereas the SVM algorithm in the classifier module 22 is trained with a fixed set of training samples, an adaptive classifier continuously learns from real world test samples. An adaptive classifier is implemented in an adaptation classifier module 30, which receives model data from an adaptation model update module 26. In summary, patches from the classifier module 22 with a high confidence of being either a clear path or a non-clear path are provided on line 24 to the adaptation model update module 26, where they are used as training samples. Data from the adaptation model update module 26 are then provided to the adaptation classifier module 30, which receives low confidence patches from the classifier module 22 on line 28. The adaptation classifier module 30 can then calculate a consistency value, which is an indication of how similar the patch being evaluated is to known clear path patches which were previously encountered on the roadway.

The consistency value from the adaptation classifier module 30 is provided on line 32, along with the probability value from the classifier module 22 on line 34, to a joint decision module 36. The function of the joint decision module 36 is to reach a joint decision about whether the patch represents a clear path, based on the inputs on the lines 32 and 34. Clear path detection results are provided as output on line 38, where they can be used by a driving assistance system. Details of the operation of the modules 26, 30, and 36 will be discussed below.

Figure 2:
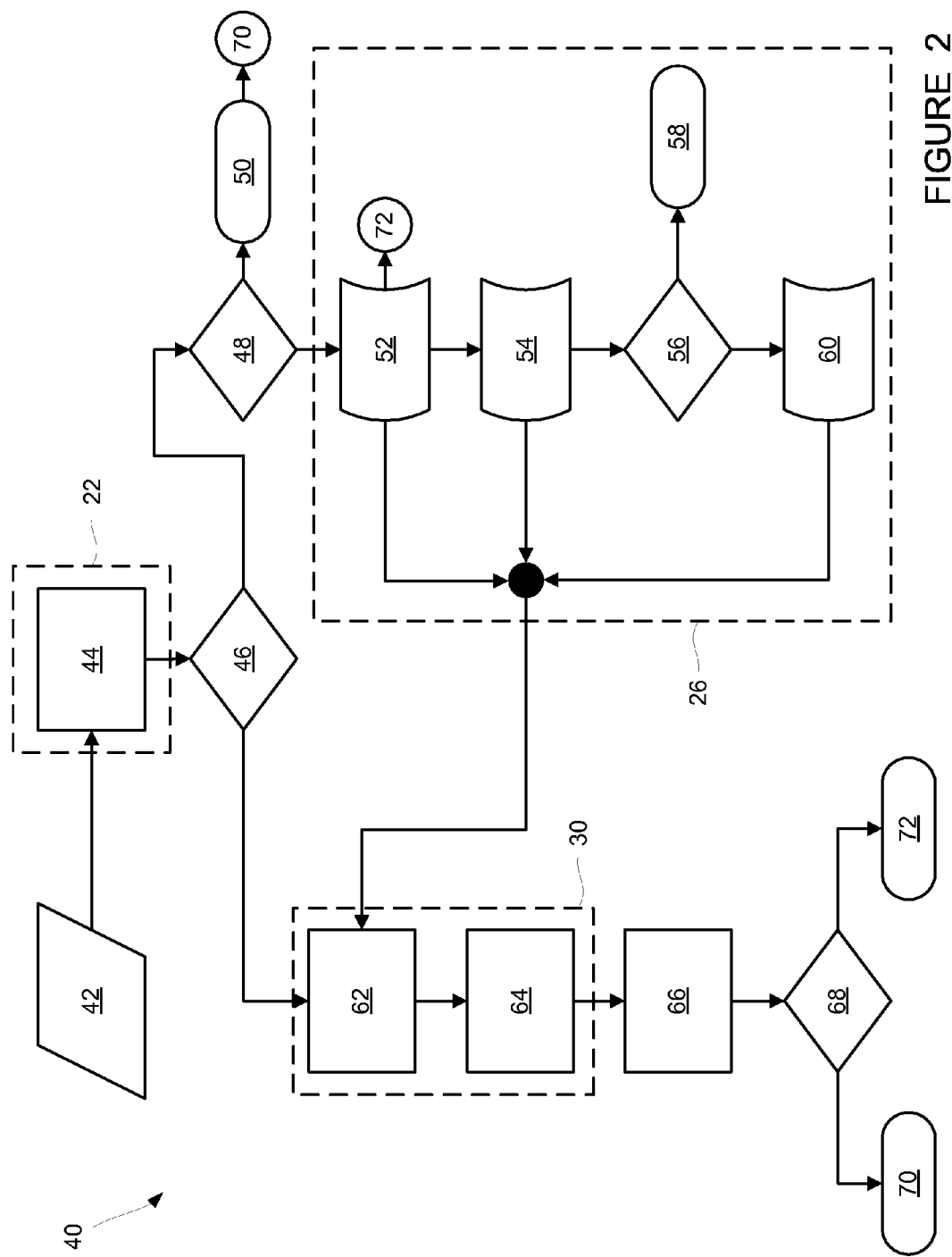
FIG. 2 is a flow chart diagram of a classifier adaptation method used by the system of FIG. 1.

FIG. 2 is a flow chart diagram 40 of a classifier adaptation method used by the adaptation model update module 26 and the adaptation classifier module 30. The method begins with data element 42, which is an image patch from the camera 12, or more specifically, the feature data for any patches selected from an image frame from the camera 12. At box 44, the feature data from the data element 42 is processed by the SVM algorithm of the first classifier module 22, as discussed previously. The output of the box 44 is a probability value for each patch, where a probability value near 1 indicates a clear path patch, and a probability value near 0 indicates a non-clear path. At decision diamond 46, patches are sorted into high confidence and low confidence groups. High confidence patches, including, for example, patches with a probability value greater than or equal to 0.9 and patches with a probability value less than or equal to 0.1, are provided to decision diamond 48. At the decision diamond 48, patches are sorted into those with very high probability and those with very low probability. The patches with very low probability of being a clear path patch, such as, those with a probability value less than or equal to 0.1, are not used for classifier training, and are sent to terminus 50 where they are used as high confidence non-clear path patches in the driving assistance system. The patches with very high probability of being a clear path patch, such as, those with a probability value greater than or equal to 0.9, are provided to current data frame 52, where they are used as high confidence clear path patches in the driving assistance system, and also used for classifier training as described below. The values 0.1 and 0.9 are used here as examples; other threshold values could be used.

The current data frame 52 stores the feature data for any patch with a very high clear path probability from the current frame of the camera 12. When a new frame is processed, the data from the current data frame 52 moves to previous data frame 54, and the new high probability patch data is received in the current data frame 52. This process repeats in real time for the continuous stream of images from the camera 12. At decision diamond 56, a second, higher threshold is applied to patch data from the previous data frame 54. For example, the second threshold could be a probability value greater than 0.95. Patches which do not meet or exceed the threshold value at the decision diamond 56 are discarded at terminus 58. Patches which meet or exceed the second threshold value at the decision diamond 56 are passed along to data pool 60. The data pool 60 contains clusters of data from previously received patches.

Figure 3:
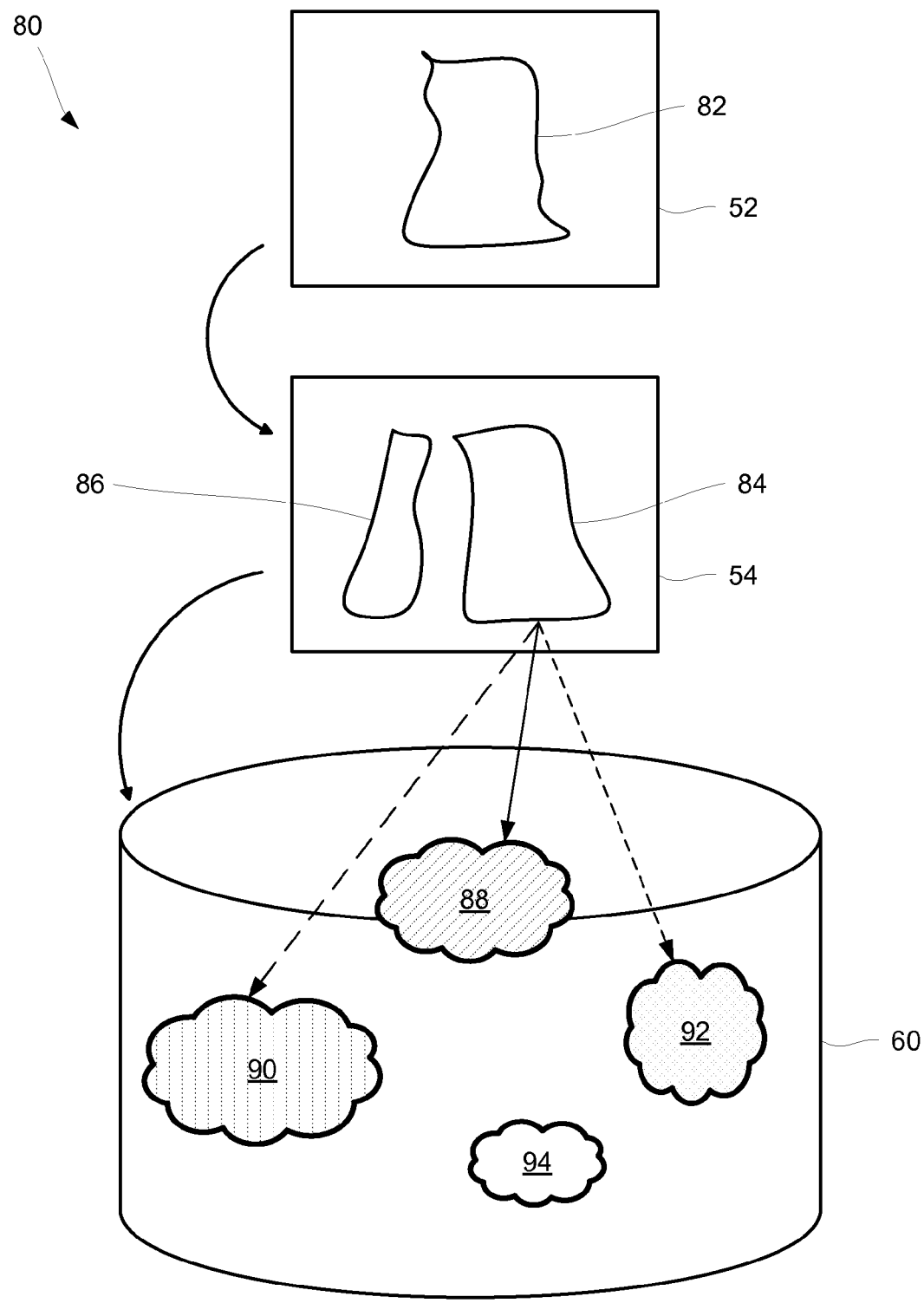
FIG. 3 is a schematic diagram illustrating the update of a set of data elements used in the method of FIG. 2.

FIG. 3 is a schematic diagram 80 showing how patch data is processed in the current data frame 52, the previous data frame 54, and the data pool 60. The current data frame 52 contains a patch 82 which, as described previously, must be large enough to be significant, and have a high enough probability of being a clear path patch that it passes the threshold test at the decision diamond 48 to update the adaptation model. Meanwhile, the previous data frame 54 contains two patches; a patch 84 and a patch 86. As discussed above, patches in the previous data frame 54 are only included in the data pool 60 if they pass a second threshold test at the decision diamond 56. For discussion purposes, it will be assumed that the patch 86 does not pass the second threshold test at the decision diamond 56, but the patch 84 does. Therefore, the patch 84 needs to be incorporated into the data pool 60 when the next image is cycled into the current frame 52. A discussion of how patches from the previous data frame 54 are incorporated into the data pool 60 follows.

Whereas the feature data in the current data frame 52 and the previous data frame 54 are stored for individual patches, the data in the data pool 60 is lumped together into clusters. Clusters represent feature vectors for groups of patches which possessed similar feature characteristics. Consider that when the data update cycle occurs and the patch 84 needs to be incorporated into the data pool 60, three clusters exist; namely, cluster 88, cluster 90, and cluster 92. In order to determine which cluster, if any, should include the patch 84, the distance from the center of the patch 84 to the center of each of the clusters 88, 90, and 92 is calculated. The minimum of these three distances is determined. If the minimum of the three distances is less than a predetermined distance threshold, then the feature data for the patch 84 is included in the cluster which had the minimum distance.

In a first illustrative example, consider that the patch 84 has a minimum distance to the cluster 88, and this distance is less than the threshold distance. In this case, the data in the cluster 88 is updated to include the data from the patch 84, the center of the cluster 88 is recomputed, and a counter number for the cluster 88 is increased by 1 to indicate that an additional patch has been included in the cluster 88. In a second illustrative example, consider that the patch 84 has a minimum distance to the cluster 88, but this distance is greater than the threshold distance. In this case, a new cluster 94 is created, containing only the data from the patch 84.

For each data update cycle, any qualifying patches from the previous data frame 54 are first incorporated into the data pool 60, then patches from the current data frame 52 are moved into the previous data frame 54, then the qualifying patches from the next camera image are moved into the current data frame 52. As described above, qualifying for the data pool 60 means meeting or exceeding the threshold at the decision diamond 56, and qualifying for the current data frame 52 means exceeding the patch size threshold and the probability threshold of the decision diamond 48.

The data pool 60 could be reset every time the vehicle is started. If the data pool 60 is empty when a data update cycle occurs, any patch from the previous data frame 54 which passes the threshold test at the decision diamond 56 creates a first cluster of its own. Individual clusters from the data pool 60 could also be culled out periodically—for example, a cluster could be deleted from the pool 60 if it has not been incremented for a certain period of time.

The diagram 80, and the description thereof in the preceding paragraphs, is most easily visualized in terms of geometric features of the patches. However, because features are mathematically represented as vectors, the same methods and calculations apply to the other feature types produced by the feature extraction module 20, namely, color features texture features, and Histogram of Oriented Gradients features.

Returning attention to FIG. 2—the current data frame 52, the previous data frame 54, and the data pool 60 are all contained in the adaptation model update module 26 of the system 10. The stored data from the current data frame 52, the previous data frame 54, and the data pool 60 are provided to a second trained classifier in the adaptation classifier module 30, which is represented by boxes 62 and 64. Low-confidence patches, that is, patches with a probability value between 0.1 and 0.9, are provided to the box 62 from the decision diamond 46. At the box 62, three distances are calculated for each of the low-confidence patches received from the decision diamond 46. The first is the minimum distance, known as d_curr, from the incoming patch to any patches contained in the current data frame 52. In the example shown in the diagram 80, the current data frame 52 contains only the patch 82. Therefore, d_curr is the distance from the incoming patch to the patch 82.

The second distance calculated at the box 62 is known as d_prev, which is the minimum distance from the incoming patch to any patches contained in the previous data frame 54. In the example shown in the diagram 80, the previous data frame 55 contains the patches 84 and 86. Therefore, d_prev is the lesser of the distance from the incoming patch to the patch 84 and the distance from the incoming patch to the patch 86. The third distance calculated at the box 62 is known as d_pool, which is the minimum distance from the incoming patch to any of the clusters contained in the data pool 60.

At the box 64, a consistency value is calculated, which is an indication of how consistent the incoming patch is to the training data in the adaptation model update module 26. The consistency value can be calculated at the box 64 with a weighted function, such as an algebraic sum, a geometric sum, or an exponential sum. In one example, the consistency value at the box 64 is a weighted algebraic function of the three distances, d_curr, d_prev, and d_pool, where the weights for the current frame and previous frame terms could be assigned a value of 1, and the weight for the pool term could be computed as the counter number for the target cluster divided by the sum of all of the counter numbers for all of the clusters in the data pool 60. In summary, the consistency value converts weighted distances—from the incoming patch to each of the elements of stored data contained in the adaptation model update module 26—into a probability that the incoming patch is a clear path.

At box 66, a joint decision is reached for the low-confidence patches, where the joint decision is based upon both the probability value from the first classifier module 22, and the consistency value from the box 64 in the adaptation classifier module 30. The joint decision value computed at the box 66 could be a simple averaging of the probability value and the consistency value, or it could be a weighted function. For example, more weight could be given to the consistency value from the box 64, as this value is based on a classifier which is trained with images from the current driving trip. In any case, a final decision is reached at decision diamond 68, and each patch is determined either to be a non-clear path at terminus 70, or a clear path at terminus 72. These results are used in the driving assistance system. As mentioned previously, the results from the high confidence non-clear path patches at the terminus 50 are sent to the terminus 70, where they are used in the driving assistance system. Likewise, the results from the high confidence clear path patches at the data store 52 are sent to the terminus 72, where they are used in the driving assistance system.

In simple terms, the purpose and effect of the method shown on the flow chart diagram 40 can be explained as follows. After being evaluated by the first classifier module 22, patches with a very high probability of being clear path roadway are directed into the adaptation model update module 26, where they serve as training samples. The training sample data contained in the adaptation model update module 26, which is being updated continuously in real time, is used in a second trained classifier in the adaptation classifier module 30. Patches which don't have a very high probability of being clear path roadway are directed through the second trained classifier in the adaptation classifier module 30. Having the benefit of training samples from the current driving trip, the adaptation classifier module 30 may be able to make a better determination of whether a patch represents clear path roadway or not. Test data from a prototype system shows that the method does in fact improve the clear path detection accuracy of the system 10 compared to a similar system with only a single, non-adaptive, trained classifier.

Other types of adaptively updated classifiers can also be employed for clear path detection, besides the additional classifier approach described above. One approach is to use only a single classifier for clear path evaluation, and adaptively update that classifier with training samples from the current driving trip which are known to represent a clear driving path. That is, rather than increasing the number of classifiers, the approach is to enrich a single classifier with selected local samples.

Figure 4:
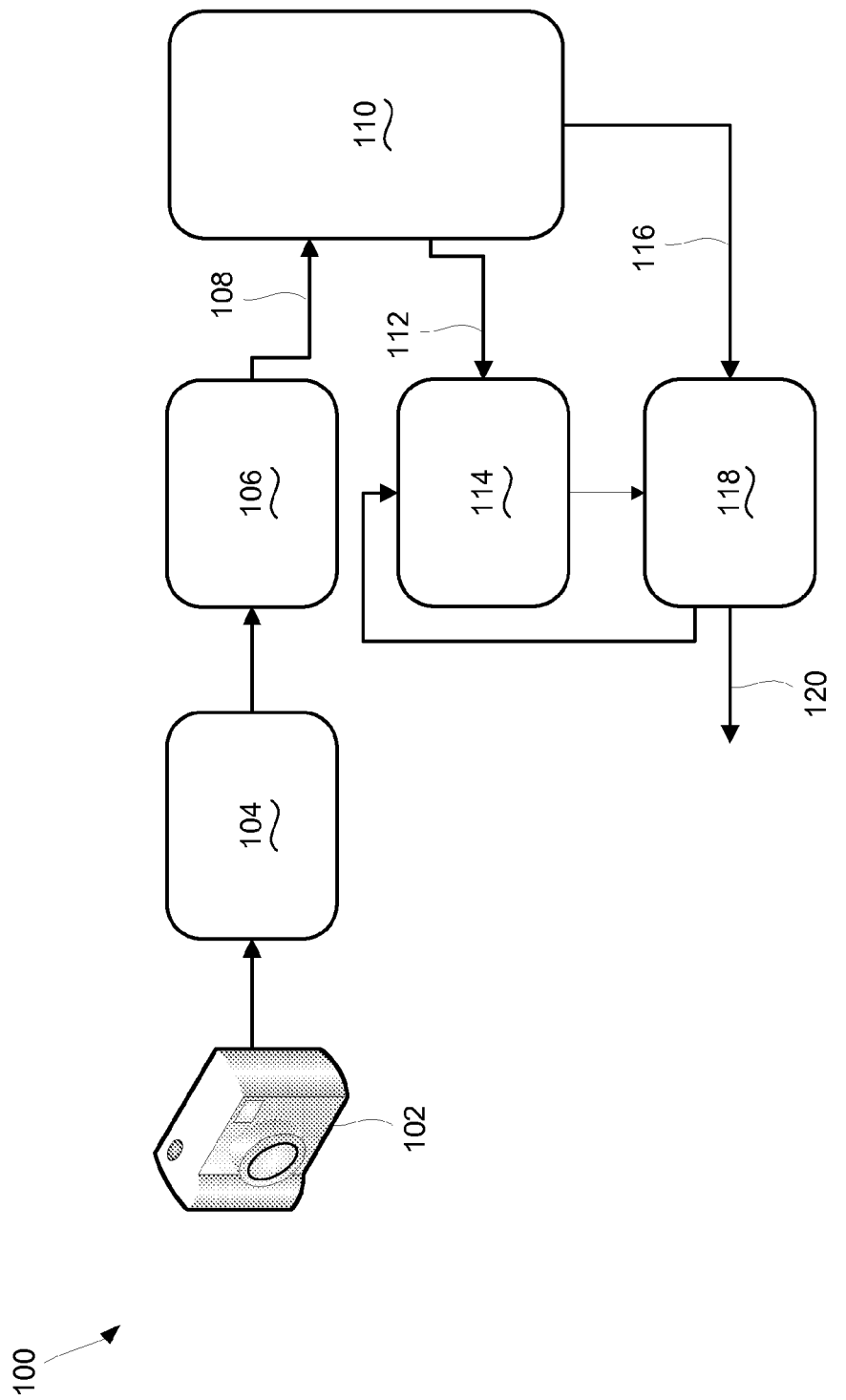
FIG. 4 is a block diagram of a system which can be used for clear path detection using an adaptive classifier updating strategy implemented via reliable local model updating.

FIG. 4 is a block diagram of a system 100 which can be used for clear path detection, using an adaptive classifier updating strategy implemented via reliable local model updating. In the system 100, a single classifier is trained to favor reliable local test samples, where the test samples are local both in terms of space and time.

The system 100 includes a camera 102, which is the same type of device and performs the same function as the camera 12 of the system 10. The camera 102 provides an image to a pre-processing module 104 which pre-processes the image. The pre-processing module provides the image to a segmentation module 106 which segments the image and provides one or more patches on line 108 to a feature extraction module 110. The operation of the pre-processing module 104, the segmentation module 106, and the feature extraction module 110 are the same as described previously for the pre-processing module 14, the segmentation module 16, and the feature extraction module 20 of the system 10. That is, the output of the feature extraction module 110 is a set of characteristic feature data for the patches produced by the segmentation module 106.

Feature vector data is provided on line 112 to a local training and test sample retrieval module 114, which gathers reliable local samples, both training and test samples, to be used for classifier training. The feature vector data is also provided on line 116 to an adaptive classifier module 118. The adaptive classifier module 118 is trained by data from the local training and test sample retrieval module 114, as will be discussed in detail below.

Figure 5:
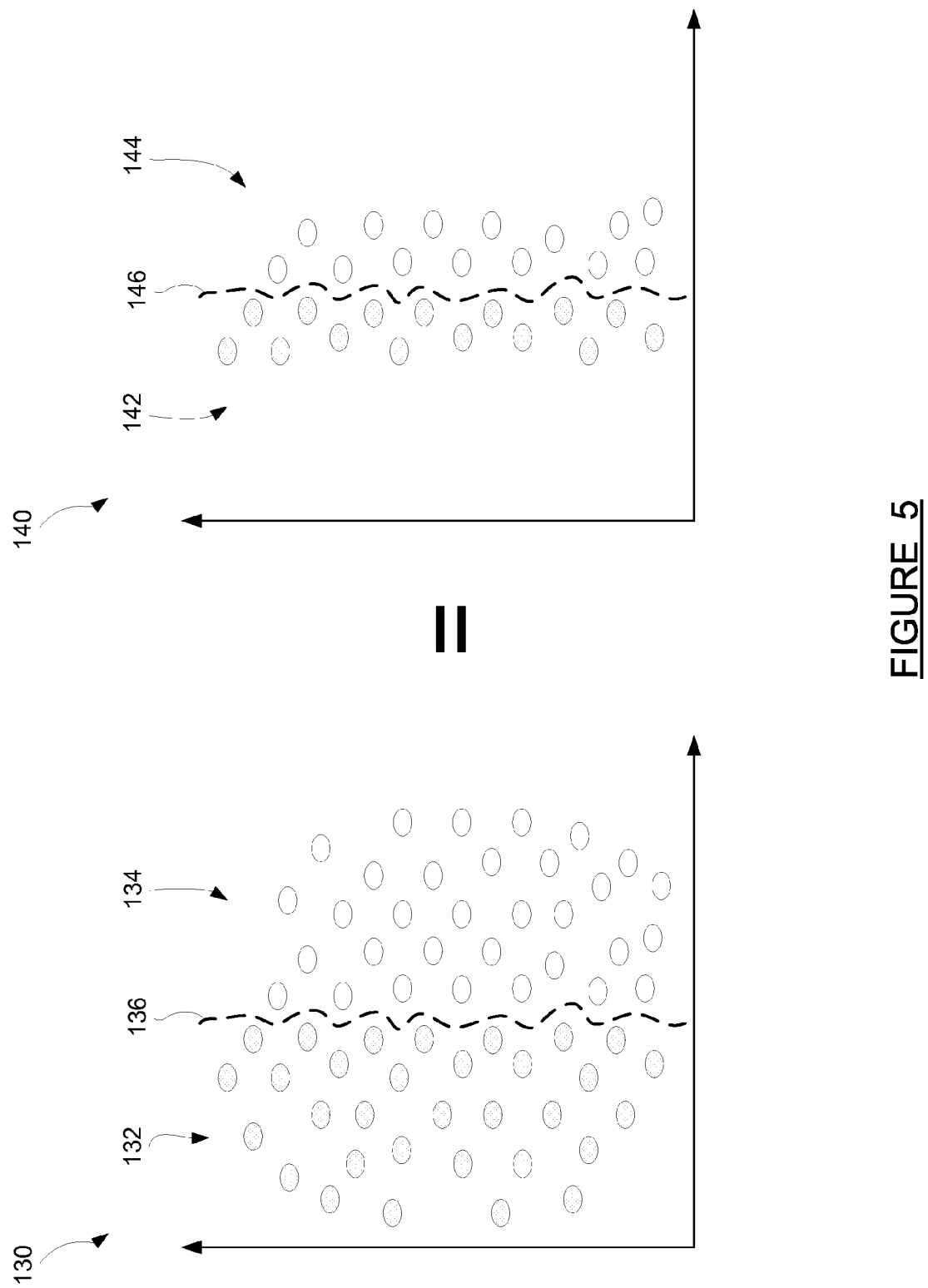
FIG. 5 is an illustration of two functionally-equivalent Support Vector Machine (SVM) training sample sets, showing how only local training samples affect the SVM classifier boundary.

The motivation behind the system 100 is to improve the speed and accuracy of SVM classification by emphasizing local training and test samples. This is based on a fundamental principle of Support Vector Machine classifiers which is illustrated in FIG. 5. FIG. 5 is an illustration of two functionally-equivalent SVM training sample sets. Training sample set 130 contains a relatively large number of training samples, including positive training samples 132 and negative training samples 134. Based on the positive training samples 132 and the negative training samples 134, an SVM classifier boundary 136 can be defined.

Training sample set 140 contains a reduced number of training samples, including positive training samples 142 and negative training samples 144. The positive training samples 142 are a subset of the positive training samples 132 which are nearest the SVM classifier boundary 136, and the negative training samples 144 are a subset of the negative training samples 134 which are nearest the SVM classifier boundary 136. Based on the positive training samples 142 and the negative training samples 144, an SVM classifier boundary 146 can be defined which is identical to the SVM classifier boundary 136. That is, an SVM classifier boundary is affected only by the training samples nearest the boundary, not by far-field training samples. Since the speed of an SVM classifier is proportional to the number of support vectors included, it follows that the training sample set 140 will result in a classifier of greater speed and equal accuracy, compared to the training sample set 130.

Figure 6:
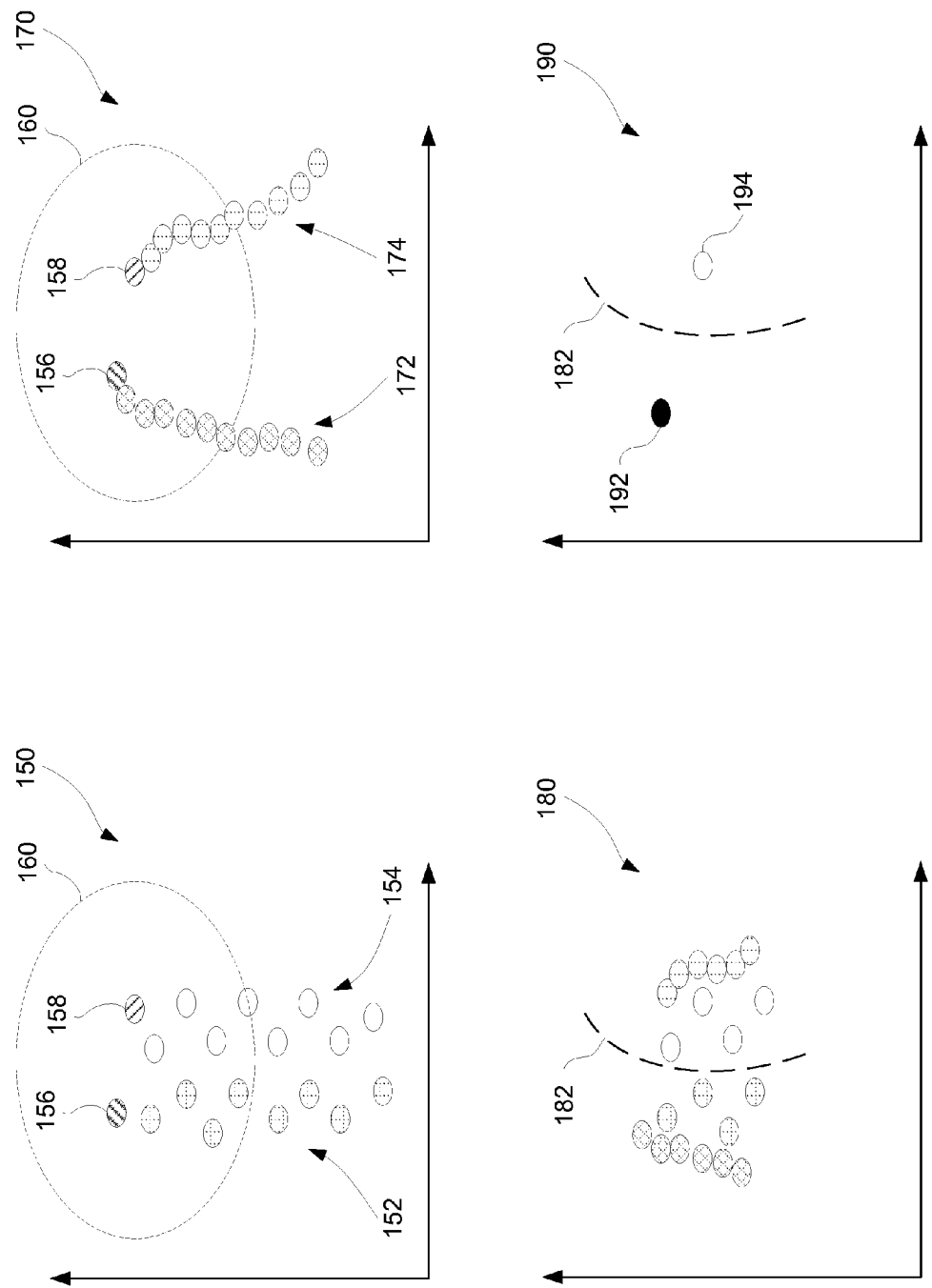
FIG. 6 is an illustration of how a classifier can be adapted to favor local training and test samples.

The principle illustrated in FIG. 5 can be applied to an adaptive clear path detection classifier, to improve its speed and accuracy. FIG. 6 is an illustration of how a classifier can be adapted to favor local training and test samples. Training sample set 150 contains positive training samples 152 and negative training samples 154. These are typically feature vectors for human-classified clear path (positive) and non-clear path (negative) images. Also shown are a positive previous test sample 156 and a negative previous test sample 158. The positive previous test sample 156 and the negative previous test sample 158 are the most recent positive and negative test samples, respectively, and are used to define an oval 160 which represents the local area of interest for selection of training and test samples.

Test sample set 170 contains positive test samples 172 and negative test samples 174, which are reliably classified samples from recent operation of the classifier. Also shown in the test sample set 170 are the positive previous test sample 156 and the negative previous test sample 158, along with the oval 160 which defines the local area of interest. Then a new training sample set 180 can be created, using the members of the positive training samples 152, the negative training samples 154, the positive test samples 172, and the negative test samples 174 which fall partially or completely within the oval 160. That is, the new training sample set 180 contains both positive and negative training samples, but only for support vectors which are local to the previous test samples 156 and 158. A new SVM classifier boundary 182 can be defined based on the data contained in the new training sample set 180. The definition of local is in terms of feature vector space, just as were the distance calculations shown in FIG. 3.

Finally, a new classifier model 190 can be used to classify the next incoming test samples, using the new SVM classifier boundary 182. Using the new classifier model 190, the next incoming test samples are classified as, for example, a positive current test sample 192 and a negative current test sample 194.

Figure 7:
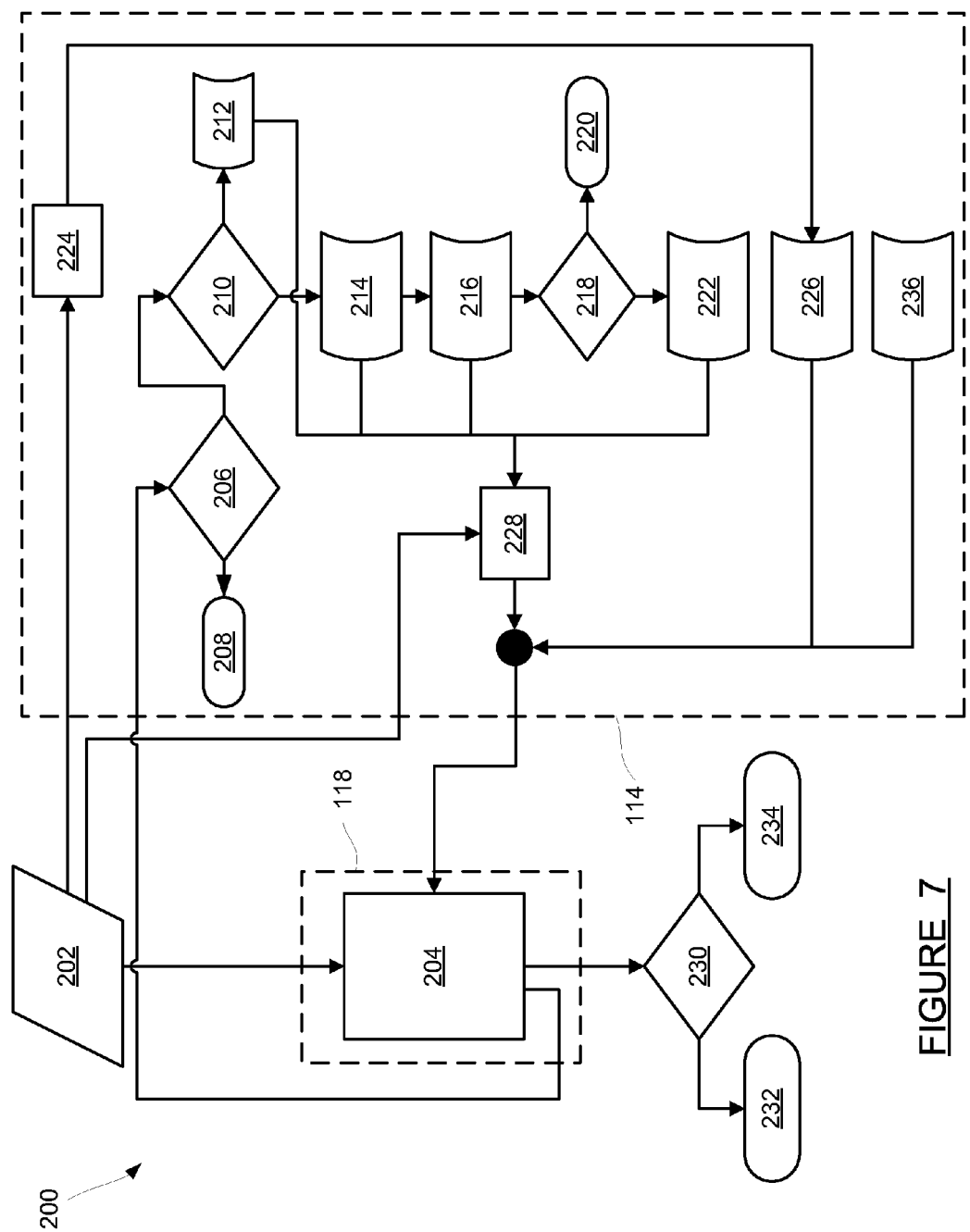
FIG. 7 is a flow chart diagram of a classifier adaptation method used by the system of FIG. 4.

The classifier adaptation approach illustrated in FIG. 6 can then be implemented in the system 100. FIG. 7 is a flow chart diagram 200 of a method for adaptation of an SVM classifier using local training samples and reliable local test samples.

The method begins with data element 202, which is an image patch from the camera 102, or more specifically, the feature data for any patches selected from an image frame from the camera 102. The feature data from the data element 202 is provided to box 204 for processing by a classifier, such as an SVM classifier. The output of the box 204 is a probability value for each patch, which is used to determine clear path or non-clear path, discussed below, and is also used as input for classifier adaptation. As described previously for the flow chart diagram 40, a probability value near 1 indicates high confidence of a clear path patch, and a probability value near 0 indicates a high confidence of a non-clear path. At decision diamond 206, patches are sorted into high confidence and low confidence groups. Low confidence patches, including for example, patches with a probability value between 0.1 and 0.9, are not used further for classifier training purposes, and are discarded at terminus 208. High confidence patches, including patches with a probability value greater than or equal to 0.9 and patches with a probability value less than or equal to 0.1, are provided to decision diamond 210. The values 0.1 and 0.9 are used here as examples; other threshold values could be used.

At the decision diamond 210, patches are sorted into those with very high probability and those with very low probability. The patches with very low probability of being a clear path patch, for example, those with a probability value less than or equal to 0.1, are provided to data store 212, where they can be used as reliable negative test samples for classifier training, as discussed previously. The patches with very high probability of being a clear path patch, for example, those patches with a probability exceeding a first threshold value, such as 0.9, are provided to current data frame 214. Previous data frame 216 receives patches from the current data frame 214 whenever a new patch moves into the current data frame 214. In turn, patches from the previous data frame 216 are evaluated against a second threshold value, such as 0.95, at decision diamond 218. Patches which do not meet or exceed the second threshold value at the decision diamond 218 are discarded at terminus 220. Patches which do exceed the second threshold value at the decision diamond 218 are incorporated into a data pool 222, which contains clusters of data from previously received patches. The incorporation of patches into the data clusters in the data pool 222 is handled in the same manner as described previously for the data pool 60 in the schematic diagram 80.

Data from the negative test sample data store 212, the current data frame 214, the previous data frame 216, and the data pool 222, can be used to adaptively train the classifier at the box 204. However, as discussed above in regards to FIG. 6, it is desirable to use only reliable test vectors which are local to the current frame (local in feature vector space). For the purpose of selecting only local test vectors, box 228 is added, which receives location information from the data element 202. The output of the box 228 is a set of reliable, local test support vectors.

Patch data from the data element 202 is also provided to box 224, where it is used to identify nearby training support vectors. Note that classification is not necessary prior to the box 224, as the box 224 only needs to know the location of the patches in order to identify training support vectors which are nearby in feature vector space. The nearby training support vectors from the box 224 are provided to data store 226. Data from the local test support vector box 228 and the nearby training support vector data store 226 can then be used to adaptively retrain the SVM classifier at the box 204, per the following discussion.

In complex classification problems, such as the image-based clear path detection problem at hand, SVM classifiers may perform better if a kernel function is added. Rather than fitting nonlinear curves to complex data, SVM classifiers can handle the complexity by using a kernel function to map the data into a different space where a hyperplane can be used to separate the data into classes. A powerful and commonly-used kernel function is the Radial Basis Function (RBF), which is a real-valued function whose value depends only on the distance from an origin or some other point called a center.

A Gaussian RBF kernel may be used in the SVM classifier at the box 204, in which the kernel function is defined as:

$$K(x,c) = \exp(-\gamma \|x-c\|^2) \tag{1}$$

Where K is the kernel function, x is the feature vector being evaluated, c is the RBF center, which is the training feature vector being used, and $\gamma$ is a constant. The notation exp ( . . . ) designates the natural logarithm base e raised to the power of the value in parenthesis.

Using adaptation inputs from the negative test sample data store 212, the current data frame 214, the previous data frame 216, the data pool 222, and the nearby training support vector data store 226, the RBF kernel defined in Equation (1) can be included in the SVM classifier at the box 204, thus continuously updating the SVM classifier at the box 204 with data from reliable local test samples. By using only reliable samples, that is, those with high confidence of being either clear path or non-clear path, the accuracy of the SVM classifier at the box 204 is improved. By using only local samples, that is, those nearby the current patch in vector space, the speed of the SVM classifier at the box 204 is improved. The probability value for each patch from the SVM classifier at the box 204 is provided to a decision diamond 230, where each patch is determined to be a non-clear path at terminus 232, or a clear path at terminus 234.

Another reliable data source can be included in the inputs to the RBF kernel used in the SVM classifier at the box 204, and that is patches for regions which the vehicle has just passed by. Clusters in the data pool 222 will certainly include data from patches for regions which the vehicle has passed by, but this data is somewhat diluted by the number of patches in the clusters. Adding a regions-passed data store 236 gives extra weight to patches for regions which the vehicle recently passed by successfully, that is, without hitting an obstacle or encountering non-road conditions. Data from the regions-passed data store 236 is included as another form of input to the RBF kernel used in the SVM classifier at the box 204.

In FIG. 7, the elements 206-228 and 236 represent the local training and test sample retrieval module 114 shown in FIG. 4. As discussed previously, the local training and test sample retrieval module 114 selects local, reliable training and test samples, which are used to adaptively train the SVM classifier at the box 204 via the RBF kernel. And the box 204 in FIG. 7 represents the adaptive classifier module 118 shown in FIG. 4, which is adaptively updated as needed, and evaluates all image patches in real time. The training of the adaptive classifier module 118 by the local training and test sample retrieval module 114 need not occur all of the time. For example, in a relatively steady state driving situation, such as prolonged highway driving, the classifier at the box 204 may be well and fully trained in a short period of time, and the local training and test sample retrieval module 114 can be by-passed until needed again. Use of the local training and test sample retrieval module 114 may be triggered by vehicle start-up, by a change in the driving scenario (from highway to city, for example), or by the passage of a certain time interval. The output of the adaptive classifier module 118, on line 120 of the system 100, is a clear path assessment for the most recent image from the camera 102. The clear path assessment is used in a driving assistance system, as discussed previously.

Figure 8:
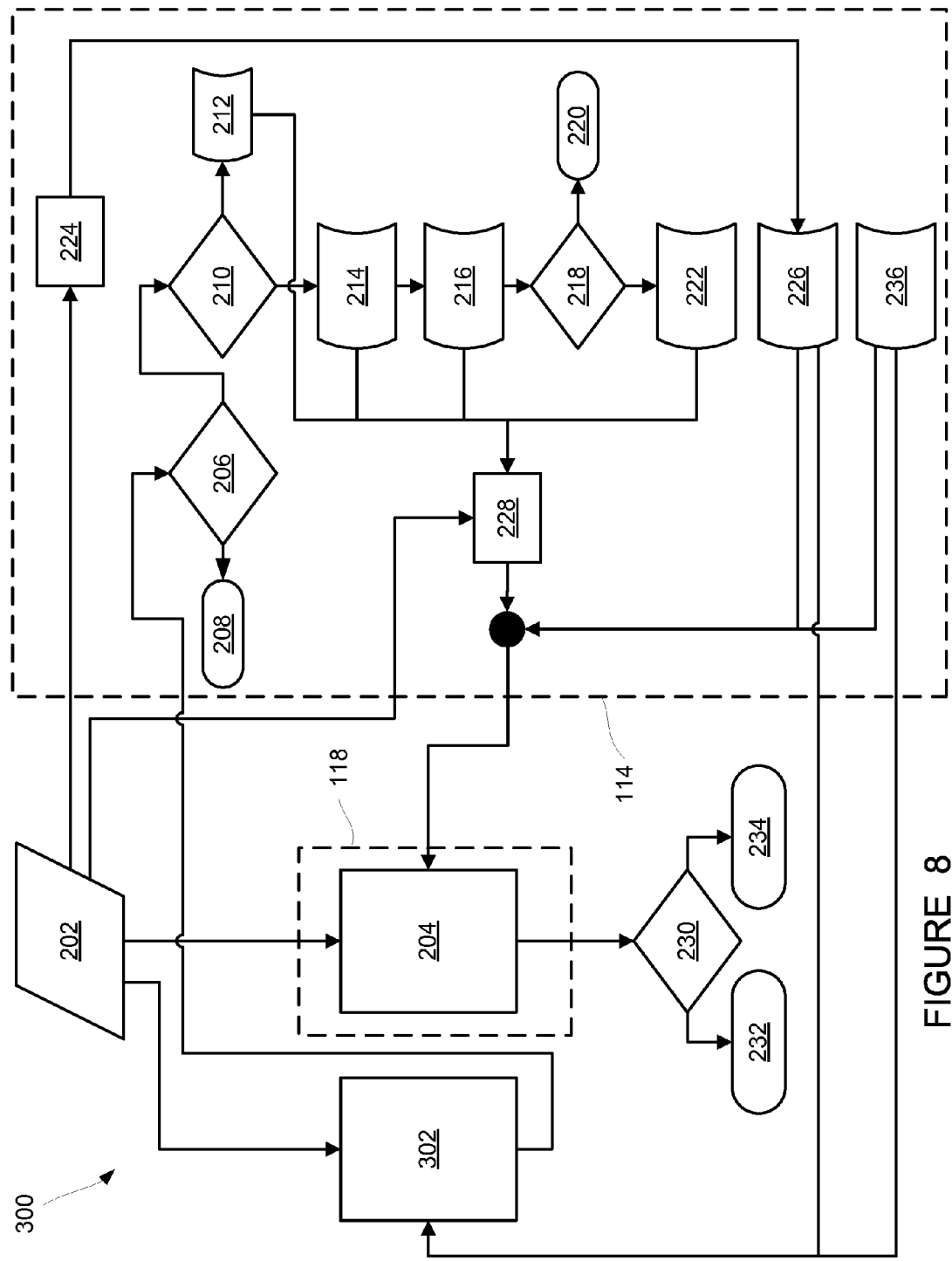
FIG. 8 is a flow chart diagram of an alternate embodiment of a classifier adaptation method which can be used by the system of FIG. 4.

FIG. 8 is a flow chart diagram 300 of an alternate embodiment of a classifier adaptation method which can be used by the system of FIG. 4. In this embodiment, the classifier at the box 204 is used to classify all patch data for clear path or non-clear path determination, as before. However, the classifier at the box 204 is not used to determine which patches are reliable enough for adaptive classifier training. Instead, another classifier is added at box 302. The classifier at the box 302 is adaptively trained only by data from the nearby training support vector data store 226 and the regions-passed data store 236. That is, the classifier at the box 302 is not affected by the local test support vectors from the box 228. Output from the box 302 is fed back to the decision diamond 206, where it is sorted based on probability value, processed through the data elements 212, 214, 216, and 222, and used to adaptively train the main classifier at the box 204 as discussed previously.

Using the methods and systems described above, the speed and accuracy of clear path roadway detection can be improved in driving assistance systems. The improvements in speed and accuracy deliver a performance benefit to the drivers of vehicles equipped with such systems, and provide a distinguishing selling point for manufacturers of such vehicles.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for detecting a clear driving path for a vehicle, said method comprising:
    processing images from a camera to produce feature data for one or more patches from each of the images;
    analyzing the feature data for the one or more patches using a trained classifier to determine a probability value;
    selecting patches whose probability value exceeds a first probability threshold value as positive test samples;
    selecting patches whose probability value does not exceed a second probability threshold value as negative test samples;
    selecting patches whose probability value does not exceed a second probability threshold value as negative test samples;
    using locations of the one or more patches to identify which training samples and which of the positive and negative test samples should be used to adaptively train the trained classifier, where the locations are defined in terms of feature vector space; and
    making a clear-driving-path or non-clear-path determination for each of the one or more patches based on the probability value.

2. The method of claim 1 wherein processing images from a camera to produce feature data for one or more patches includes segmenting the images to define the one or more patches, and extracting the feature data for the one or more patches.

3. The method of claim 2 wherein segmenting the images to define the one or more patches includes selecting only patches with a size exceeding a predetermined size threshold.

4. The method of claim 2 wherein extracting the feature data for the one or more patches includes extracting one or more of; geometric features, color features, texture features, and Histogram of Oriented Gradients features.

5. The method of claim 1 wherein analyzing the feature data for the one or more patches using a trained classifier includes using a Support Vector Machine classifier with a Radial Basis Function kernel.

6. The method of claim 5 wherein selecting patches whose probability value exceeds a first probability threshold value as positive test samples includes storing data for the positive test samples as stored elements in a current data frame, a previous data frame, and a cluster data pool.

7. The method of claim 6 wherein the stored elements in the current data frame, the previous data frame, and the cluster data pool are used as inputs to the Radial Basis Function kernel.

8. The method of claim 5 further comprising using patches for regions which were recently passed by the vehicle to further adaptively train the trained classifier.

9. The method of claim 8 wherein using patches for regions which were recently passed by the vehicle to further adaptively train the trained classifier includes using the patches for the regions which were recently passed by the vehicle as input to the Radial Basis Function kernel.

10. The method of claim 1 further comprising using the clear-driving-path or non-clear-path determination in a driving assistance system in the vehicle.

11. A method for detecting a clear driving path for a vehicle, said method comprising:
processing images from a camera to produce feature data for one or more patches from each of the images;
analyzing the feature data for the one or more patches using a trained classifier to determine a probability value, where the trained classifier is a Support Vector Machine classifier with a Radial Basis Function kernel;
selecting patches whose probability value exceeds a probability threshold value as positive test samples;
using locations of the one or more patches to identify which training samples and which of the positive test samples should be used to adaptively train the trained classifier, where the locations are defined in terms of feature vector space;
making a clear-driving-path or non-clear-path determination for each of the one or more patches based on the probability value; and
using the clear-driving-path or non-clear-path determination in a driving assistance system in the vehicle.

12. The method of claim 11 wherein processing images from a camera to produce feature data for one or more patches includes segmenting the images to define the one or more patches, and extracting the feature data for the one or more patches.

13. The method of claim 11 wherein selecting patches whose probability value exceeds a first probability threshold value as positive test samples includes storing data for the positive test samples as stored elements in a current data frame, a previous data frame, and a cluster data pool, and using the stored elements in the current data frame, the previous data frame, and the cluster data pool as inputs to the Radial Basis Function kernel.

14. The method of claim 11 further comprising using patches for regions which were recently passed by the vehicle as input to the Radial Basis Function kernel to further adaptively train the trained classifier.

15. A clear path detection system for a vehicle comprising:
a camera for providing images of a scene in front of the vehicle or behind the vehicle;
a segmentation module for defining one or more patches from each of the images;
a feature extraction module for extracting feature data for the one or more patches from each of the images;
a classifier module for analyzing the feature data to determine a probability value for each of the one or more patches, where the classifier module uses a Support Vector Machine classifier with a Radial Basis Function kernel;
a test sample retrieval module for using the feature data from patches whose probability value exceeds a probability threshold value, and which are local in feature vector space, as inputs to the Radial Basis Function kernel to adaptively train the classifier module; and
a decision module for evaluating the probability value to make a clear-driving-path or non-clear-path determination for each of the one or more patches.

16. The system of claim 15 wherein the test sample retrieval module stores data for the patches whose probability value exceeds the probability threshold value as stored elements in a current data frame, a previous data frame, and a cluster data pool.

17. The system of claim 15 wherein the test sample retrieval module uses locations, in feature vector space, of the one or more patches to identify local training samples and local test samples, and uses the local training samples and the local test samples as input to the Radial Basis Function kernel to adaptively train the classifier module.

18. The system of claim 15 wherein the test sample retrieval module also uses patches for regions which were recently passed by the vehicle as additional input to the Radial Basis Function kernel to adaptively train the classifier module.

* * * * *